UNITED STATES PATENT OFFICE.

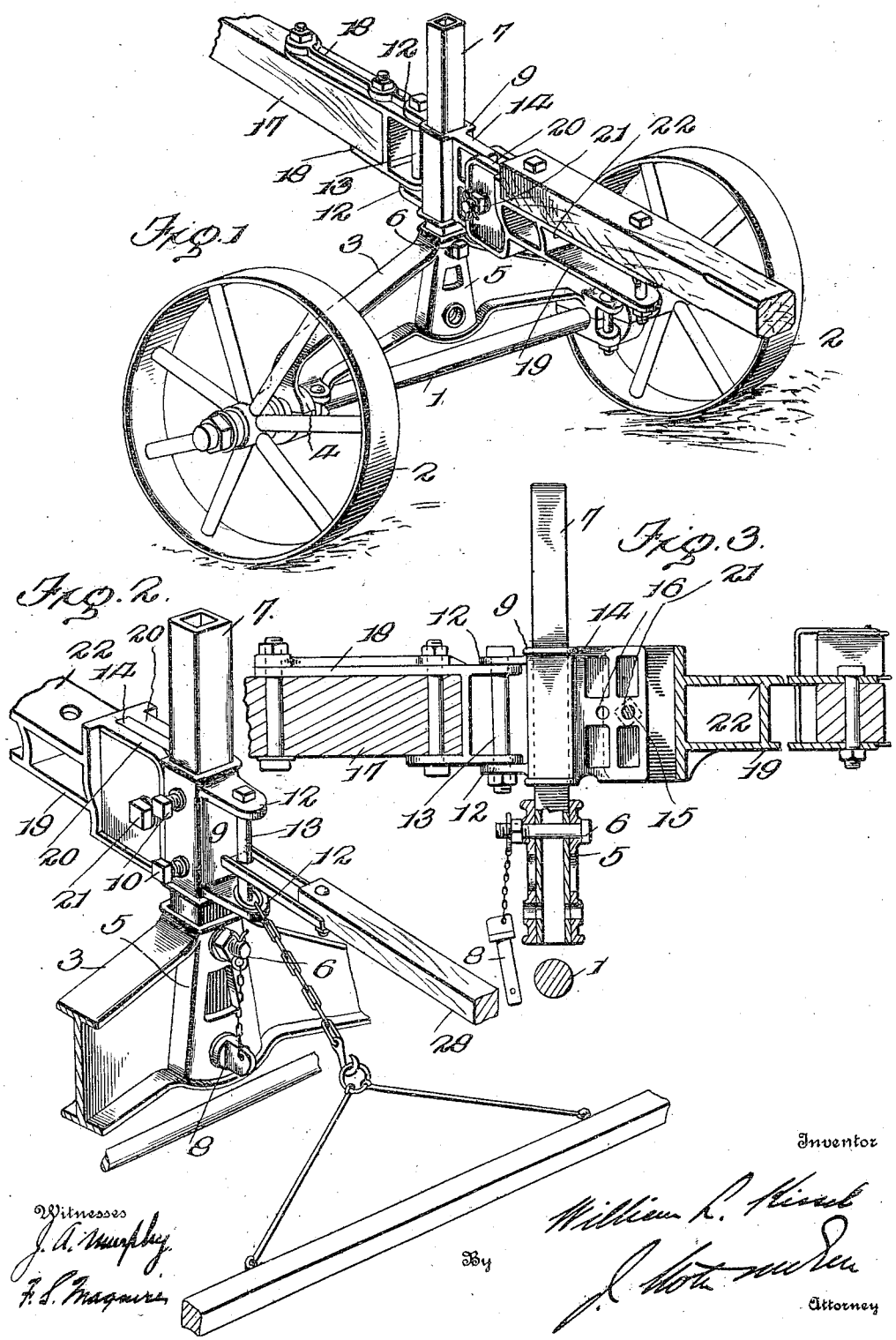

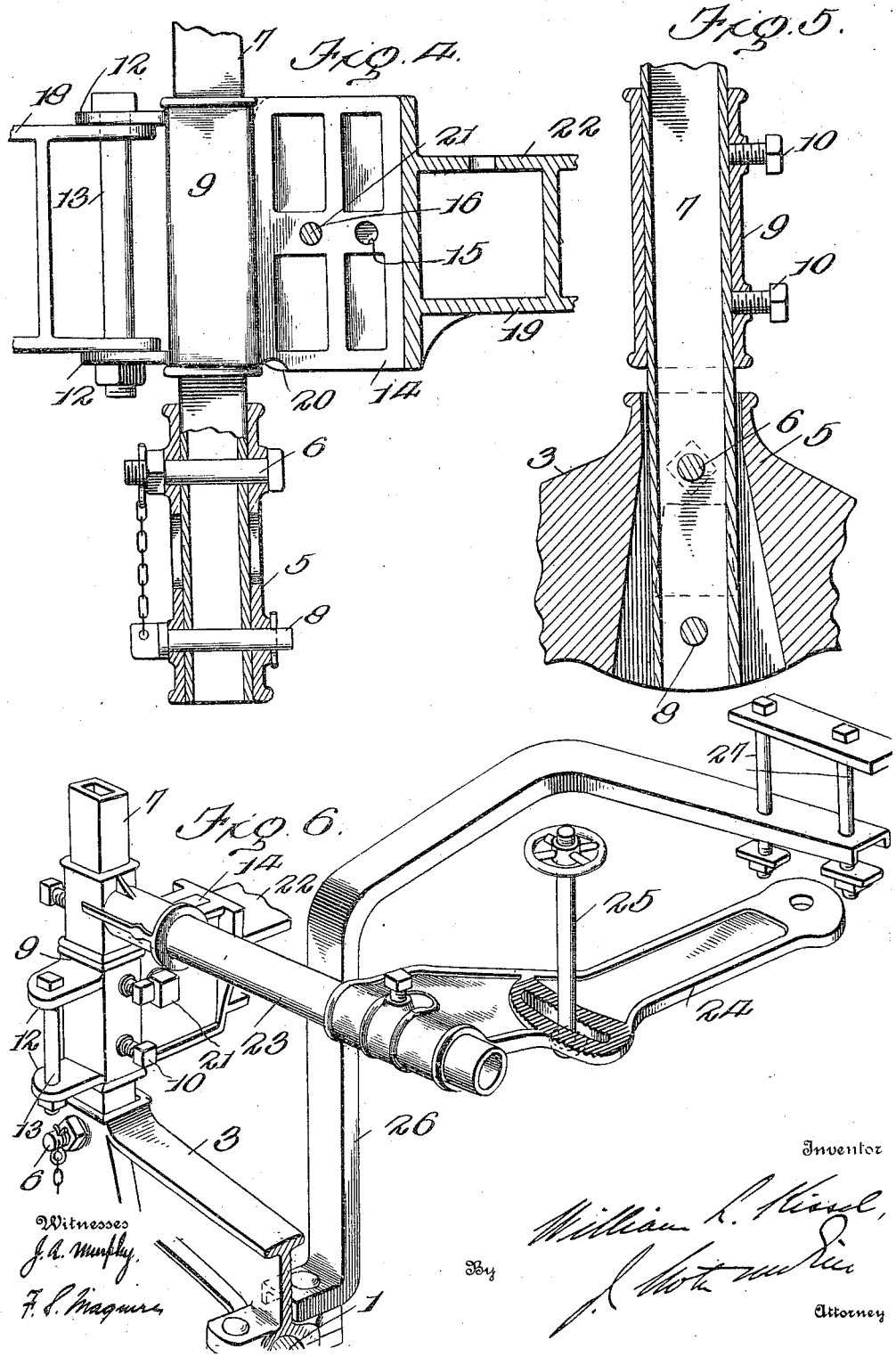

WILLIAM L. KISSEL, OF HARTFORD, WISCONSIN.

TRUCK MECHANISM.

964,434. Specification of Letters Patent. Patented July 12, 1910.

Application filed May 10, 1909. Serial No. 495,097.

*To all whom it may concern:*

Be it known that I, WILLIAM L. KISSEL, of Hartford, in the county of Washington and State of Wisconsin, have invented certain new and useful Improvements in Truck Mechanisms; and I do hereby declare the following to be a full, clear, and exact description of the invention, such as will enable others skilled in the art to which it appertains to make and use the same.

The primary object of this invention is to provide simple and highly efficient truck mechanism for farming implements which will be capable of employment in connection with various kinds of implements regardless of whether or not they are provided with stub-poles which are ordinarily secured to mechanism of this character, that is to say, my improvements may be used in connection with disk harrows, grain or corn binders, mowers, land rollers, drills, etc., and also spike and spring tooth harrows.

A further object is to provide truck mechanism capable of being used with equal facility in connection with any number of horses, and with or without draft poles.

The invention will be hereinafter fully set forth and particularly pointed out in the claims.

In the accompanying drawings, Figure 1 is a view in perspective with portions of the stub-pole and draft-pole broken away. Fig. 2 is a similar view showing a connection for an implement not employing a stub-pole. Fig. 3 is an enlarged side view showing the clevis pivotally held. Fig. 4 shows the clevis rigidly secured. Fig. 5 is a vertical longitudinal sectional view. Fig. 6 shows the off-set draft attachment.

Referring to the drawings, 1 designates the truck axle; 2 the carrying wheels therefor, and 3 a bracket having bearings 4 at its ends by which it is secured to the axle close to the hubs of the wheel. This bracket has a vertically extended splay socket 5, wider at its lower end than at the top. In the opposite walls of this socket is fitted a bolt 6 by which the bracket is pivotally secured to an upright 7 which extends down into the socket. By this means the truck may turn on the pivot bolt 6 to accommodate itself to any obstruction or unevenness in the ground. In some instances it is desirable not to have this relative oscillation, and for this purpose I suspend from the bracket a bolt 8 which may be passed through coincident openings in the socket and the lower end of the upright.

9 is a sleeve adjustably mounted on the upright and held by screws 10. This sleeve at its rear carries upper and lower opposite flanges 12 through which is passed a pivot bolt 13. At its front this sleeve has a forwardly projecting plate 14 which is provided with two holes or openings 15 and 16, one forward of the other. The front edge of this plate is straight, that is, it is parallel to the upright.

When the truck is employed in connection with such farming instruments as are ordinarily provided with stub-poles, such as disk harrows, binders, mowers, etc., the truck is secured to the forward end of a stub-pole 17, a portion of which is shown in Fig. 1, by means of a bracket 18 bolted to the forward end of such stub-pole and connected to sleeve 9 by bolt 13. The sleeve is adjusted to the proper height so that the stub-pole will occupy a level position, and the locking bolt 8 is withdrawn so that the truck may be free to oscillate relatively to upright 6. Under these conditions a clevis 19 is secured to plate 14 by means of a bolt 21 passed through one of two holes 15, 16, in said plate. This clevis consists of two spaced-apart cheeks 20 having coincident openings for the bolt 21, and two forwardly-projecting arms 22 equipped with suitable bolt openings. The connecting wall at the forward ends of cheeks 20 is straight like the forward edge of plate 14, so that when bolt 21 is inserted through hole 16 the clevis will be rigidly held at right angles to the upright, that is to say, it is precluded from swinging on its bolt. When no draft pole is used, the clevis bolt is passed through the forward opening 15 so that the clevis may swing to allow freedom of movement to the whiffletree which is bolted to arms 22. The clevis bolt is always passed through opening 15 when the truck is employed in connection with implements having stub-poles. The connection is made through opening 16 only when the truck mechanism is used with such implements as have no stub-poles, namely, spike and spring-tooth harrows.

Should it be desired to use a draft pole in connection with an uneven number of horses, such as three or five, I provide an off-set draft attachment. (See Fig. 6.) This is shown as comprising a bar 23 having a socket for the upright to which it may be held by set screws, such bar extending either to the right or to the left, laterally from the upright. On this bar is adjustably mounted a plate 24 having sockets to accommodate the bar, and at its outer end an opening for the pivot bolt of the draft pole, the rear end of the latter being secured to such plate by a bolt 25 passed through a slightly curved slot in the plate. This permits the pole to be readily adjusted so that it will occupy a place between swingletrees.

In employing my truck mechanism in connection with such implements as spike or spring tooth harrows which do not employ stub-poles, the upright 7 is locked to its supporting bracket by bolt 8, the bracket 18 is omitted, and the chain of the implement is connected to the truck by means of bolt 13, and the clevis bolt is passed through the rear opening 16 to prevent oscillation. (See Fig. 2.) When an even number of horses is employed the draft-pole is attached to the top of the clevis, but when an uneven number of horses is used, the off-set draft attachment is employed as hereinbefore described. In this connection I find it necessary, because of the absence of positive connection of a stub-pole leading from the implement, to employ additional means to brace the draft pole. For this purpose I employ a brace 26 which is connected to the truck at one end of bracket 3, preferably by a retaining bolt of one of the bearings 4, such brace extending upwardly and secured to the pole by nutted bolts 27, as shown in Fig. 6. If a riding attachment is used in connection with a harrow of the kind not employing stub-poles, the pole or tongue of the riding attachment is pivotally secured to the truck by bolt 13 as shown at 28, Fig. 2.

The advantages of my invention will be apparent to those skilled in the art. It will be noted in particular that the truck mechanism is capable of a wide range of use, and while the truck is ordinarily free to oscillate relatively to the upright, yet when the truck is used in connection with those implements which do not employ stub-poles such upright may be locked to prevent the independent oscillation of the truck, since in such circumstances the truck and the upright are free to oscillate as a whole without interfering with the implements.

I claim as my invention:—

1. A truck-mechanism for farming implements comprising a truck having carrying wheels and an axle therefor, a bracket mounted on said axle, an upright pivoted in said bracket to provide an oscillatory movement between the upright and the truck, a member adjustably mounted on said upright to which a farming implement may be connected, a clevis, and means connecting said clevis directly to said member.

2. A truck-mechanism for farming implements comprising a truck having carrying wheels and an axle therefor, a bracket mounted on said axle, an upright pivoted in said bracket to provide an oscillatory movement between the upright and the truck, a member adjustably mounted on said upright to which a farming implement may be connected, said member having two openings, a clevis, a bolt for securing such clevis to said member by being passed through either of said openings, and means for preventing said clevis from oscillating on said bolt.

3. A truck-mechanism for farming implements comprising a truck having carrying wheels and an axle therefor, a bracket mounted on said axle, an upright pivoted in said bracket to provide an oscillatory movement between the upright and the truck, a sleeve adjustably mounted on said upright to which a farming implement may be connected, said sleeve having a forwardly-projecting plate, a clevis, means for securing the latter to said plate, and means for preventing said clevis from oscillating.

4. A truck-mechanism for farming implements comprising a truck having carrying wheels and an axle therefor, a bracket mounted on said axle, an upright pivoted in said bracket to provide an oscillatory movement between the upright and the truck, a sleeve adjustably mounted on said upright to which a farming implement may be connected, said sleeve having a forwardly-projecting plate, a clevis comprising spaced-apart cheeks between which said plate is designed to fit, said plate and said cheeks having straight edges which are designed to engage and hold said clevis from oscillating, and means for securing said clevis to said plate.

5. A truck-mechanism for farming implements comprising a truck having carrying wheels and an axle therefor, a bracket mounted on said axle, an upright pivoted in said bracket to provide an oscillatory movement between the upright and the truck, a sleeve adjustably mounted on said upright and having rearwardly projecting flanges, a bolt in said flanges for securing a farming implement to the sleeve, a plate projecting forwardly from said sleeve having two openings therein, a clevis, a bolt for securing said clevis by being passed through either of said openings, and means for preventing said clevis from oscillating when in one of its positions relative to said plate.

6. A truck-mechanism for farming implements comprising a truck having carrying wheels and an axle therefor, a bracket mounted on said axle, an upright pivoted in said bracket to provide an oscillatory movement between the upright and the truck, and a draft attachment comprising a bar adjustably mounted on said upright and projecting laterally therefrom parallel to said axle, and a draft-pole connecting plate adjustably mounted on said bar.

7. A truck-mechanism for farming implements comprising a truck having carrying wheels and an axle therefor, a bracket mounted on said axle, an upright carried by said bracket, a sleeve adjustably mounted on said upright, means carried by said upright to which a farming implement may be loosely secured, a laterally extended bar mounted on said upright, a draft-pole connecting plate adjustably mounted on said bar, and a brace extended from said bracket and designed to be secured to a draft-pole.

8. The combination with a truck comprising carrying wheels and an axle therefor, of a bracket mounted on said axle having a socket, an upright pivoted in said socket, a sleeve adjustable on said upright having, at the rear, means to which a farming implement may be connected, a clevis, means extending forwardly from said sleeve to which said clevis may be pivoted, and means for preventing said clevis from oscillating relatively to said sleeve.

9. The combination with a truck comprising carrying wheels and an axle therefor, of a bracket mounted on said axle having a socket, an upright pivoted in said socket, means for rigidly locking said upright to said bracket, a sleeve adjustable on said upright having, at the rear, means to which a farming implement may be loosely connected, and an off-set draft-attachment comprising a bar extending laterally from said upright, and a draft-pole connecting plate mounted on said bar, said plate having means for adjusting the position of a draft-pole mounted thereon.

In testimony whereof, I have signed this specification in the presence of two subscribing witnesses.

WILLIAM L. KISSEL.

Witnesses:
P. A. RIX,
ALMA MENZEL.